United States Patent Office 2,843,594
Patented July 15, 1958

2,843,594

SUBSTITUTED ISONICOTINIC ACID AMIDES AND PROCESS OF PREPARING SAME

Heinrich Leditschke, Frankfurt am Main, and Heinrich Rolly and Heinz Schmidt-Ruppin, Bad Soden (Taunus), Germany, assignors to Farbwerke Hoechst Aktiengesellschaft vormals Meister Lucius & Brüning, Frankfurt am Main, Germany, a corporation of Germany No Drawing. Application May 16, 1956
Serial No. 585,145

Claims priority, application Germany May 20, 1955

8 Claims. (Cl. 260—295)

The present invention relates to substituted isonicotinic acid amides of the general formula:

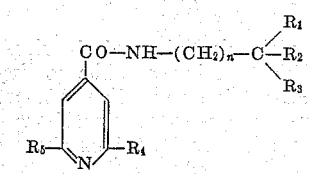

wherein $n$ represents the numbers 1 or 2, $R_1$ represents a phenyl or pyridyl radical which may be substituted by halogen atoms, alkyl or alkoxy groups of low molecular weight, $R_2$ represents a hydrogen atom or a phenyl radical which may be substituted by halogen atoms, alkyl or alkoxy groups of low molecular weight, $R_3$ represents a hydrogen atom or an alkyl group of low molecular weight, $R_4$ and $R_5$ represent hydrogen atoms, halogen atoms, alkoxy or alkylmercapto groups of low molecular weight, as well as the halogen alkylates thereof, i. e., alkylhalide adducts thereof, and a process of preparing such compounds.

The invention especially relates to compounds of the above-mentioned formula wherein $n$ represents the number 2, $R_1$ and $R_2$ represent phenyl radicals substituted by halogen, $R_3$ an alkyl radical of low molecular weight and $R_4$ and $R_5$ represent hydrogen atoms.

Now we have found that substituted isonicotinic acid amides, which are distinguished by valuable therapeutic properties, can be obtained by reacting isonicotinic acid or the reactive derivatives thereof, which can be substituted in 2 and/or 6 position by halogen atoms, alkoxy or alkylmercapto groups, or the hydrohalic acid salts thereof, with substituted alkyl amines of the general formula:

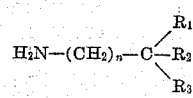

wherein $n$ represents the numbers 1 or 2, $R_1$ represents a phenyl or pyridyl radical which may be substituted by halogen atoms, alkyl or alkoxy groups of low molecular weight, $R_2$ represents a hydrogen atom or a phenyl radical which may be substituted by halogen atoms, alkyl or alkoxy groups of low molecular weight and $R_3$ represents a hydrogen atom or an alkyl group of low molecular weight, and by reacting, if necessary, the halogen atoms in the pyridine nucleus of the reaction products, originating from the isonicotinic acid, in the usual manner with alkali hydrosulfide, alkali-mercaptides or alkali alcoholates.

As starting materials according to the invention for example the following compounds come into consideration: isonicotinic acid, 2,6-dichloro-isonicotinic acid, 6-chloro-isonicotinic acid, 2-ethoxy-6-chloro-isonicotinic acid, 2,6-diethoxy-isonicotinic acid and 2-butoxy-6-chloro-isonicotinic acid. Instead of the free acids there may be used the corresponding reactive derivatives, especially the acid halides, acid azides and acid esters. It is advantageous to use the hydrohalic acid salts thereof.

As amines the following compounds are for example mentioned: diphenyl-ethylamine, 2-(p-fluorophenyl)-2-phenyl-ethylamine, 2-(p-chlorophenyl)-2-phenyl-ethylamine, 2,2-(p,p'-dichlorodiphenyl)-ethylamine, 2-pyridyl-(2)-2-phenyl-ethylamine, 3,3-diphenyl-propylamine, 3-(p-fluorophenyl)-3-phenyl-propylamine, 3-(p-chlorophenyl)-3-phenyl-propylamine, 3,3-(p,p'-dichloro-diphenyl)-propylamine, 3-(p-fluorophenyl)-3-(p-chlorophenyl)-propylamine, 3-(o-chlorophenyl)-3-(p-chlorophenyl)-propylamine, 3-(m-chlorophenyl)-3-(p-chlorophenyl)-propylamine, 3-(m-methyl-p-chlorophenyl)-3-p-chlorophenyl)-proylamine, 3-(2',4'-dichlorophenyl)-3-(p-chlorophenyl)-propylamine.

It is expedient to perform the reaction according to the invention in the presence of acid-binding agents, especially when the hydrohalic acid salts of the isonicotinic acid derivatives are used. Above all, organic bases such as pyridine, quinoline or trimethylamine come into consideration, but an excess of the amine used as reaction component can also be applied as acid-binding agent. The addition of an indifferent organic solvent, for example benzene, toluene, xylene, acetone or ether is possible but not necessary. The reaction may be performed either at room temperature or at a moderately reduced temperature, preferably between —5° C. and +20° C.; it is expedient to work while cooling with ice. The reaction can be completed by subsequently heating the mixture on the steam bath.

In the case of a reaction with alkyl amines which are substituted by 1 or 2 aryl radicals a good yield is obtained at a smooth reaction, especially when free isonicotinic acid is used. It is expedient to perform the reaction while heating the components for a short time to high temperatures, it being preferable to work between 260° C. and 320° C.

If it is desired, the halogen atoms present in the pyridine nucleus and originating from the isonicotinic acid can be substituted by sulfhydryl, alkylmercapto or alkoxy groups. For this purpose the compounds obtained can be treated with alkali hydrosulfide, alkali mercaptides or with alkali alcoholates in the presence of solvents; low aliphatic alcohols are especially used as solvents. If several halogen substituents are present, the exchange of the halogen atoms can be performed stepwise; in this case the reaction temperature is of decisive importance. Generally, 1 halogen atom can be substituted at water bath temperature and 2 halogen atoms at a temperature above 130° C.

The products obtained according to the process of the invention can be transformed into the corresponding halogen alkylates by treating them with alkyl halides.

The compounds obtainable according to the process of the invention correspond to the general formula:

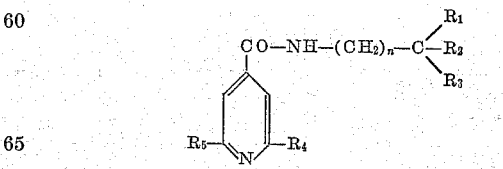

wherein $R_1$, $R_2$, $R_3$ and $n$ have the meanings given above and $R_4$ and $R_5$ represent hydrogen atoms, halogen atoms, alkoxy or alkylmercapto groups of low molecular weight. They are valuable medicaments which are distinguished by a good efficiency against influenza infections.

For example the isonicotinic acid-[3,3-(p,p'-dichloro-diphenyl)-propyl-(1)]-amide shows after oral application of 1 mg./20 g. to the mouse an average retardation of influenza APR 8 of 25% and after application of 4 mg./20 g. of 62%. In the case of subcutaneous application of 3.2 mg./20 g. the average retardation of influenza APR 8 is 27% on the average and after the application of 8 mg./20 g. 57.5% on the average.

The following examples serve to illustrate the invention but they are not intended to limit it thereto; the parts being by weight.

*Example 1*

17.8 parts of isonicotinic acid chloride hydrochloride are added within 10 minutes, while cooling with ice, to a solution of 21.5 parts of 2-(p-fluorophenyl)-2-phenyl-ethylamine in 50 parts by volume of pyridine; the reaction mixture is then heated on the steam bath for half an hour. After pouring the reaction mixture into 1000 parts by volume of sodium carbonate solution and after filtering off with suction the crystals formed and recrystallizing them from ethyl alcohol, 18.3 parts of isonicotinic acid-[2-(p-fluoro-phenyl-2-phenyl)-ethyl-(1)]-amide are obtained which, after a repeated recrystallization has a melting point of 149–150° C.

The 2-(p-fluorophenyl)-2-phenyl-ethylamine used as starting material was prepared as follows:

254 parts of benzylcyanide are brominated, while stirring, at 105° C. by adding, dropwise, 106 parts by volume of bromine. The reaction mixture is then heated to 105° C. for half an hour, 400 parts by volume of fluoro-benzene are added, the temperature is allowed to decrease and at 20° C. 294 parts of anhydrous aluminum chloride are added. After heating for 2 hours to 50° C. the reaction mixture is poured onto ice, the reaction product is taken up in ether, the ethereal solution is washed with sodium hydroxide solution and finally with water. Subsequent to the evaporation of the ether and double distillation 215 parts of (p-fluoro-phenyl)-phenyl-acetonitrile (boiling at 192° C. under a pressure of 25 mm. of mercury) are obtained. 100 parts of this compound are hydrogenated at 90° C. and under a pressure of 100 atmospheres in a mixture of 300 parts of methanolic amomnia solution and 15 parts of Raney nickel.

After the usual working up 52.5 parts of 2-(p-fluoro-phenyl)-2-phenyl-ethylamine (boiling at 178° C. under a pressure of 22 mm. of mercury) are obtained.

*Example 2*

14.2 parts of isonicotinic chloride-hydrochloride (obtined by reacting 20 parts of isonicotinic acid with 100 parts by volume of thionyl chloride) are added within 10 minutes, while cooling with ice, to a solution of 19.8 parts of 2-pyridyl-(2)-2-phenylethyl-amine in 50 parts by volume of pyridine. The reaction mixture is then heated on the steam bath for half an hour. After pouring the mixture into 1000 parts by volume of sodium carbonate solution, filtering off with suction the crystals formed and recrystallization from ethyl alcohol, 10 parts of isonicotinic acid-[2-pyridyl-(2)-2-phenyl-ethyl-(1)]-amide (melting point 152° C.) are obtained in the form of colorless crystals.

*Examples 3*

8.9 parts of isonicotinic acid chloride hydrochloride are added within 10 minutes, while cooling with ice, to a solution of 12.1 parts of [2-(p-fluorophenyl)-2-phenyl-2-ethyl]-ethylamine in 25 parts by volume of pyridine and then heated on the steam bath for half an hour. After pouring the mixture into 500 parts by volume of sodium carbonate solution crystals are obtained which, after recrystallization from ethyl alcohol, yield 3.5 parts if isonicotinic acid-[(2-p-fluorophenyl)-2-phenyl-2-ethyl-ethyl-(1)]-amide melting at 114°–115° C.

The 2-(p-fluorophenyl)-2-phenyl-2-ethyl-ethylamine used as starting material was prepared as follows:

13.2 parts of sodamide are suspended in 100 parts by volume of benzene and 63.3 parts of (p-fluorophenyl)-phenyl-acetonitrile are dropwise added to the mixture while stirring and occasionally cooling. 46.8 parts of ethyl iodide are then added dropwise while heating to 30–40° C. and the mixture is then stirred for half an hour. After decomposition with water the benzene layer is separated. Subsequent to the drying with magnesium sulfate and evaporating the benzene the residue is distilled. 56 parts of p-fluorophenyl-phenyl-ethyl-acetonitrile (boiling at 180–181° C. under a pressure of 16 mm. of mercury) are obtained. 56 parts of this compound are hydrogenated in a mixture of 350 parts of methanolic ammonia solution and 10 parts of Raney nickel at 95° C. and under a pressure of 100 atmospheres. After the usual working up 46 parts of 2-(p-fluorophenyl)-2-phenyl-2-ethyl-ethylamine (boiling at 182–183° C. under a pressure of 18 mm. of mercury) are obtained.

*Example 4*

17.8 parts of isonicotinic acid chloride-hydrochloride are added within 10 minutes, while cooling with ice, to 28 parts of 3,3-(p,p'-dichloro-diphenyl)-propylamine so that the temperature does not rise above 20° C. The reaction mixture is then heated on the steam bath for half an hour and poured into 1000 parts by volume of sodium carbonate solution. By filtering off with suction the separated crystals 33 parts of a crude product of isonicotinic acid - [3,3 - (p,p' - dichloro - diphenyl)-propyl-(1)]-amide are obtained which, after having been recrystallized twice from ethyl alcohol has a melting point of 123° C.

The 3,3-(p,p'-dichloro-diphenyl)-propylamine used as starting material was prepared as follows:

A Grignard solution, prepared of 48 parts of magnesium chips, 383 parts of p-chloro-bromobenzene and 1000 parts by volume of absolute ether is mixed with a solution of 354 parts of α-cyano-p-chlorocinnamic acid methyl ester in 2000 parts by volume of benzene. Ether and benzene are distilled off on a descending condenser, the reaction product obtained is poured onto ice and decomposed with dilute sulfuric acid. The mixture is allowed to stand overnight. The oil is then taken up in ether and dried over calcium chloride. After evaporating the ether 524 parts of a crude product of α-cyano-β,β-(p,p'-dichloro-diphenyl)-propionic acid methyl ester are obtained. 524 parts of this crude product are heated for 3 hours on the steam bath with a solution of 63 parts of sodium hydroxide in 1575 parts by volume of water. The mixture is then filtered, acidified with dilute sulfuric acid, the separated oil is taken up in ether and dried over sodium sulfate. After evaporating the ether, the residue is heated for 15 minutes to 170° C. with 100 parts by volume of quinoline. The quinoline is then driven off with steam, the remaining oil is taken up in ether and dried over calcium chloride. After evaporating the ether and distillation under highly reduced pressure 313 parts of β,β-(p,p'-dichloro-diphenyl)-propionitrile are obtained (boiling at 225–226° C. under a pressure of 3 mm. of mercury). 100 parts of this compound are hydrogenated in a mixture of 1000 parts of methanolic ammonia solution and 15 parts of Raney nickel at 90° C. and under a pressure of 65 atmospheres. After the usual working up 55 parts of 3,3-(p,p'-dichloro-diphenyl)-propylamine (boiling at 204–206° C. under a pressure of 3 mm. of mercury) are obtained in the form of a colorless oil.

*Example 5*

(a) 76.8 parts of 2,6-dichloro-isonicotinic acid are heated with 400 parts by volume of thionyl chloride for 5 hours on the steam bath in a reflux condenser. The thionyl choloride is then evaporated under reduced pressure. The dark residue is introduced into a solution of 112 parts of 3,3-(p,p'-dichloro-diphenyl)-propylamine in 200 parts by volume of pyridine, while cooling with ice. Subsequent to the addition of the solution the reaction mixture is heated on the steam bath for half an hour and then added to 4000 parts by volume of a dilute aqueous sodium carbonate solution. The separated crystals are filtered off with suction and dried at 100° C. The crude product is dissolved in ethyl alcohol, boiled with animal charcoal for one hour and the major part of the alcohol is evaporated. 117 parts of 2,6-dichloro-isonicotinic acid - [3,3 - (p,p' - dichloro - diphenyl) - propyl-(1)]-amide (melting point 171–172° C.) are obtained in the form of slightly yellow crystals.

($b_1$) 22.7 parts of 2,6-dichloro-isonicotinic-[3,3-(p,p'-dichloro-diphenyl)-propyl-(1)]-amide are heated for 7½ hours with a solution of sodium alcoholate, prepared from 2.3 parts of sodium and 400 parts by volume of absolute alcohol. The separated sodium chloride (3.1 parts) are filtered off with suction, the solution is concentrated by evaporation and acidified with dilute hydrochloric acid. 22.3 parts of a crude product of 2-ethoxy-6 - chloro - isonicotinic acid - [3,3 - (p,p' - dichloro-diphenyl)-propyl-(1)]-amide are obtained which after dissolution in ethyl alcohol and crystallization has a melting point of 169° C.

($b_2$) 20 parts by volume of ethylmercaptan and 11.4 parts of 2,6-dichloro-isonicotinic acid-[3,3-(p,p'-dichloro-diphenyl)-propyl-(1)]-amide are added to a solution of 4.6 parts of sodium in 100 parts by volume of methanol. The reaction mixture is heated in a reflux condenser for 1 hour. Subsequent to cooling, the reaction mixture is poured into water and 11.3 parts of a crude product of 2 - ethylmercapto - 6 - chloro - isonicotinic acid - [3,3-(p,p'-dichloro-diphenyl)-propyl-(1)]-amide are obtained which, subsequent to double recrystallization from ethyl alcohol, is obtained in the form of colorless crystals melting at 143° C.

Example 6

20.2 parts of 2 ethoxy-6-chloro-isonicotinic acid are heated for half an hour on the steam bath in a reflux condenser with 100 parts by volume of thionyl chloride until the acid has been dissolved. The thionyl chloride is then evaporated under reduced pressure and the crystalline residue is introduced into a solution of 28 parts of 3,3-(p,p'-dichloro-diphenyl)-propylamine (obtained according to the description given in Example 4) in 50 parts by volume of pyridine while cooling with ice. When the residue has been added, the mixture is heated for another half an hour on the steam bath. The reaction product is then poured into 500 parts by volume of sodium carbonate solution. 36.5 parts of a crude product are obtained which, after drying, are dissolved in ethyl alcohol and boiled with animal charcoal for one hour. Subsequent to evaporating the major part of the solvent, 19.9 parts of 2-ethoxy-6-chloro-isonicotinic acid-[3,3-(p,p' - dichloro - diphenyl) - propyl - (1)] - amide (melting point 169° C.) are obtained in the form of colorless crystals.

The 2-ethoxy-6-chloro-isonicotinic acid used as starting material was prepared as follows:

19.2 parts of 2,6-dichloro-isonicotinic acid are heated for 20 hours on the steam bath with a solution of 4.6 parts of sodium in 70 parts by volume of absolute alcohol. The mixture is then diluted with water and acidified with dilute hydrochloric acid. 19 parts of 2-ethoxy-6-chloro-isonicotinic acid (melting point 167° C.) are obtained.

Example 7

74.5 parts of 2,2-diphenyl-ethylamine and 46.5 parts of isonicotinic acid are heated in the metallic bath in an open container for 10 minutes at a bath temperature of 300–310° C. 110 parts of isonicotinic acid-(2,2-diphenyl-ethyl-(1))-amide are obtained. After recrystallization from benzene the compound melts at 185° C.

Example 8

12.3 parts of isonicotinic acid and 21.5 parts of 2-(p-fluoro - phenyl) - 2 - phenyl - ethylamine (boiling at 178° C. under a pressure of 22 mm. of mercury), (obtained according to the prescription indicated in Example 1) are heated in an open container to 310° C. for 5 minutes. The warm reaction product is dissolved in 30 parts by volume of ethyl alcohol. After trituration 24 parts of isonicotinic acid-[2-(p-fluoro-phenyl)-2-phenyl-ethyl-(1)]-amide (melting point 149° C.) are obtained.

Example 9

12.3 parts of isonicotinic acid and 24.3 parts of 2-(p-fluorophenyl)-2-phenyl-2-ethyl - ethylamine (boiling at 182° C. under a pressure of 18 mm. of mercury) (obtained according to the prescription indicated in Example 3) are heated in the metallic bath in an open container for 5 minutes to 300–310° C. The warm melt is then dissolved in 30 parts by volume of ethyl alcohol, 50 parts by volume of ether and an amount of petroleum ether are added until turbidity occurs. After trituration 19.6 parts of isonicotinic acid -[2-(p-fluorophenyl)-2-phenyl-2-ethyl-ethyl-(1)-]-amide (melting point 112° C.) are obtained.

Example 10

12.3 parts of isonicotinic acid and 23.2 parts of 2-(p-chlorophenyl)-2-phenyl-ethylamine (boiling at 196–198° C. under a pressure of 17 mm. of mercury) (obtained according to the prescription indicated in Example 1) are heated to 310° C. in an open container for 5 minutes. The warm reaction product is dissolved in 30 parts by volume of ethyl alcohol and filtered. 19 parts of isonictonic acid-[2-(p-chlorophenyl)-2-phenyl-ethyl-(1)]-amide are obtained which, after recrystallization from ethyl alcohol melt at 136–137° C.

Example 11

23.1 parts of isonicotinic acid and 50 parts of 2,2-(p,p'-dichloro-diphenyl)-ethylamine (boiling at 230° C. under a pressure of 23 mm. of mercury) (obtained by starting from p-chloro-benzylcyanide according to prescription indicated in Example 1) are heated to 300–310° C. in an open container for 5 minutes. After distillation under highly reduced pressure 26 parts of isonicotinic acid-[2,2-(p,p'-dichlorodiphenyl)-ethyl-(1)]-amide (boiling at 290° C. under a pressure of 5 mm. of mercury) are obtained in the form of a yellow amorphous mass.

Example 12

110 parts of 3,3-diphenyl-propylamine and 61.5 parts of isonicotinic acid are heated in the metallic bath to 310° C. for 10 minutes in an open container. After distillation under highly reduced pressure 141 parts of isonicotinic acid-(3,3-diphenyl-propyl-(1))-amide (boiling at 282° C. under a pressure of 0.8 mm. of mercury) are obtained which, after recrystallization from a mixture of benzene and petroleum ether are obtained in the form of colorless crystals melting at 92.5° C.

Example 13

23 parts of 3-fluorophenyl-3-phenyl-propylamine, boiling at 138° C. under a pressure of 2 mm. of mercury (obtained according to the prescription indicated in Example 4 from p-bromo-fluorobenzene), and 12.3 parts of isonicotinic acid are heated in an open container to 310° C. for 10 minutes. The reaction mixture is poured into 1000 parts by volume of hot water, the oil formed is taken up in chloroform, and the residue obtained after drying and concentrating by evaporation the chloroform solution is distilled under highly reduced pressure. 13.5 parts of isonicotinic acid-[3-(p-fluorophenyl)-3-phenyl-propyl-(1)]-amide boiling at 272° C. under a pressure of 3 mm. of mercury are obtained in the form of an amber-yellow resin.

*Example 14*

12.3 parts of isonicotinic acid and 24.5 parts of 3-(p-chlorophenyl)-3-phenyl-propylamine, boiling at 178° C. under a pressure of 4 mm. of mercury (obtained according to the prescription indicated in Example 4) are heated in the metallic bath in an open container to 270–280° C. for 5 minutes. The hot melt is then poured into 1000 parts by volume of hot water, drawn off from the hot water and the sirup obtained is dissolved in chloroform. After drying the chloroform over calcium chloride and subsequent to the evaporation of the chloroform, the residue is distilled under highly reduced pressure. 16 parts of isonicotinic acid-[3-(p-chlorophenyl)-3-phenyl-propyl-(1)]-amide (boiling at 292° C. under a pressure of 4 mm. of mercury) are obtained in the form of an amber-yellow resin.

*Example 15*

12.3 parts of isonicotinic acid and 28 parts of 3,3-(p,p'-dichloro-diphenyl)-propylamine (boiling at 204–206° C. under a pressure of 3 mm. of mercury), obtained according to the prescription indicated in Example 4, are heated in the metallic bath in an open container to 310° C. for 10 minutes. The warm reaction product is then dissolved in 30 parts by volume of ethyl alcohol and filtered. 27.6 parts of isonicotinic acid-[3,3-(p,p'-dichloro-diphenyl)-propyl-(1)]-amide are obtained which, after recrystallization from alcohol melts at 123° C. The iodine ethylate melts at 189° C.

*Example 16*

24 parts of isonicotinic acid and 52.7 parts of 3-(p-fluorophenyl)-3-(p-chlorophenyl)-propylamine (boiling at 180–182° C. under a pressure of 3 mm. of mercury), obtained according to the prescription indicated in Example 4, are heated for 8 minutes to 300–310° C. in the metallic bath in an open container. The reaction mixture is dissolved in a little alcohol an water is added until turbidity sets in. 38.5 parts of isonicotinic acid-[3-(p-fluorophenyl)-3-(p-chlorophenyl)-propyl-(1)] - amide (melting point 91–92° C.) are obtained in the form of colorless crystals, which crystallize with ½ mol of water.

*Example 17*

12.3 parts of isonicotinic acid and 28 parts of 3-(o-chlorophenyl)-3-(p-chlorophenyl)-propylamine (boiling at 192° C. under a pressure of 7 mm. of mercury) obtained according to the prescription indicated in Example 4, are heated for 5 minutes to 300–310° C. in the metallic bath in an open container. The reaction product is dissolved in chloroform, extracted by shaking with a solution of sodium hydroxide dried over potassium carbonate and then distilled under a highly reduced pressure. 30 parts of isonicotinic acid-[3-(o-chlorophenyl)-3-(p-chlorophenyl)-propyl-(1)]-amide (boiling at 274–276° C. under a pressure of 6 mm. of mercury) are obtained in the form of a yellow resin.

*Example 18*

24.6 parts of isonicotinic acid and 56 parts of 3-(m-chlorophenyl)-3-(p-chlorophenyl)-propylamine (boiling at 186° C. under a pressure of 5 mm. of mercury), obtained according to the prescription indicated in Example 4, are heated for 10 minutes in the metallic bath in an open container to 300–310° C. The reaction product is then dissolved in chloroform, extracted by shaking with sodium carbonate solution and dried over potassium carbonate. After evaporating the solvent the residue is dissolved in ethyl alcohol and water is added until turbidity occurs. 47 parts of a crude product melting at 94–95° C. are obtained which, after recrystallization from alcohol yields 35.7 parts of isonicotinic acid-[3-(m-chlorophenyl) - 3 - (p - chlorophenyl) - propyl - (1)] - amide melting at 97° C.

*Example 19*

11.3 parts of isonicotinic acid and 27 parts of 3-(m-methyl - p - chlorophenyl) - 3 - (p - chlorophenyl)-propylamide (boiling at 203–204° C. under a pressure of 7 mm. of mercury), obtained according to the prescription indicated in Example 4 from 6-chloro-3-bromo-toluene, are heated in the metallic bath in an open container for 15 minutes at 300–310° C. The warm melt is then dissolved in 20 parts by volume of alcohol and filtered. 22.7 parts of isonicotinic acid-[3-(m-methyl-p-chlorophenyl) - 3 - (p - chlorophenyl) - propyl - (1)] - amide are obtained; after recrystallization from alcohol the product melts at 108° C.

*Example 20*

11.5 parts of isonicotinic acid and 29.4 parts of 3-(2',4'-dichlorophenyl) - 3 - (p - chlorophenyl) - propylamine (boiling at 244–246° C. under a pressure of 21 mm. of mercury) obtained according to the prescription indicated in Example 4, are heated in the metallic bath in an open container for 5 minutes at 300° C. The reaction product obtained is taken up in chloroform extracted by shaking with sodium carbonate solution and dried over potassium carbonate. After evaporating the solvent the residue is distilled under highly reduced pressure. 23 parts of isonicotinic acid-[3-(2',4'-dichlorophenyl)-3-(p-chlorophenyl)-propyl-(1)]-amide (boiling at 304° C. under a pressure of 5 mm. of mercury) are obtained in the form of a yellow resin.

*Example 21*

24.6 parts of isonicotinic acid and 49.4 parts of 3,3-(p,p'-difluoro-diphenyl)-propylamine (boiling at 183° C. under a pressure of 15 mm. of mercury), obtained according to prescription indicated in Example 4, are heated in the metallic bath in an open container for 10 minutes at 310–320° C. The reaction product obtained is dissolved in chloroform and extracted by shaking with sodium carbonate solution. After drying over potassium carbonate the reaction product is distilled under highly reduced pressure. 38.4 parts of isonicotinic acid-[3,3-(p,p' - difluoro - diphenyl) - propyl - (1)] - amide (boiling at 260° C. under a pressure of 5 mm. of mercury) are obtained in the form of a yellow resin.

*Example 22*

15.1 parts of isonicotinic acid ethyl ester and 28 parts of 3,3-(p,p'-dichloro-diphenyl)-propylamine are heated for 6 hours to 200–220° C. in a container provided with a small ascending tube, so that the alcohol which is formed can escape. 20 parts by volume of ethyl alcohol are added to the reaction product. After trituration 24.5 parts of isonicotinic acid - [3,3 - (p,p' - dichloro-diphenyl)-propyl-(1)]-amide (melting point 120° C.) are obtained. After repeated recrystallization the melting point is at 123° C.

*Example 23*

20 parts of isonicotinic acid hydrochloride are introduced, while cooling with ice, into a solution of 15.6 parts of p-chlorophenyl-ethylamine in 50 parts by volume of pyridine within 10 minutes, and the reaction mixture obtained is then heated on the steam bath for half an hour. Subsequent to pouring the mixture into 2000 parts by volume of water 21.7 parts of a crude product are obtained which yield after double recrystallization from ethyl alcohol the isonicotinic acid-[2-(p-chlorophenyl)-ethyl-(1)]-amide melting at 124° C.

*Example 24*

40 parts of isonicotinic acid chloride hydrochloride are introduced, while cooling with ice, into a solution of 38 parts of 3,4-dichloro-phenylethylamine in 100 parts by volume of pyridine. The mixture is then heated on the steam bath for half an hour. Subsequent to pouring the reaction mixture into 2000 parts by volume of water 42 parts of a crude product are obtained which, after recrystallization from ethyl alcohol yields the isonicotinic acid-[2-(3',4' - dichloro - phenyl) - ethyl-(1)]-amide (melting point 112°C.) in the form of colorless crystals.

*Example 25*

13.5 parts of isonicotinic acid and 31.5 g. of 3-(3',4'-dichlorophenyl) - 3 - (4' - chlorophenyl) - propylamine (boiling at 210–212° C. under a pressure of 7 mm. of mercury) obtained according to the prescription indicated in Example 4, are heated in an open container for 5 minutes to 300–310° C. The warm reaction product is dissolved in a little hydrous ethyl alcohol and the solution is filtered. On cooling 30 parts of isonicotinic acid-[3 - (3',4' - dichlorophenyl) - 3 - (4' - chlorophenyl)-propyl-(1)]-amide are separated in the form of crystals, which contain ½ mol of crystal water. After recrystallization from a little hydrous ethyl alcohol the substance melts at 109–110° C.

We claim:

1. A member selected from the group consisting of isonicotinic acid amides of the general formula:

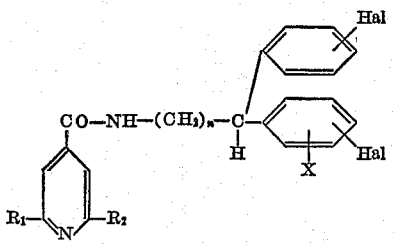

and lower alkyl halide adducts thereof, wherein $n$ stands for an integer from 1 to 2, $R_1$ and $R_2$ are each members selected from the group consisting of hydrogen, halogen, lower alkoxy and lower alkylmercapto, X stands for a member of the group consisting of hydrogen, halogen and $CH_3$, and Hal stands for a halogen atom.

2. Isonicotinic acid[3,3 - (p,p' - dichloro - diphenyl) - propyl-(1)]-amide.

3. Isonicotinic acid[3 - (p - fluorophenyl - 3 - p-chlorophenyl)-propyl-(1)]-amide.

4. Isonicotinic acid[3 - (3',4' - dichlorophenyl)-3-(4'-chlorophenyl)-propyl-(1)]-amide.

5. 2 - ethylmercapto - 6 - chloro-isonicotinic acid-[3,3-(p,p'-dichloro-diphenyl)-propyl-(1)]-amide.

6. The process of preparing isonicotinic acid amides of the general formula:

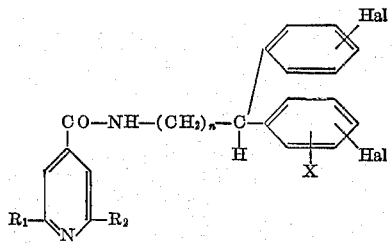

wherein $n$ stands for an integer from 1 to 2, $R_1$ and $R_2$ are each members selected from the group consisting of hydrogen, halogen, lower alkoxy and lower alkylmercapto, X stands for a member of the group consisting of hydrogen, halogen and $CH_3$, and Hal stands for a halogen atom, which comprises reacting a pyridine compound selected from the group consisting of compounds of the general formula:

wherein $R_1$ and $R_2$ have the meanings given above, the acid halides, acid azides and acid esters of these compounds, with substituted alkylamines of the general formula:

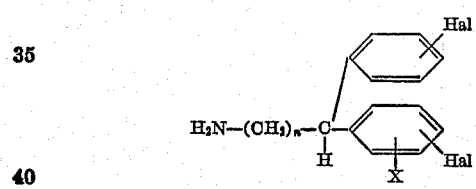

wherein $n$, X, and Hal have the meanings given above.

7. The process as claimed in claim 6 wherein the pyridine compound is added as a hydrohalic acid addition salt, the reaction being conducted between —5° C. and +20° C. in the presence of an acid-binding agent.

8. The process as claimed in claim 6 including the additional step of substituting a member selected from the group consisting of lower alkylmercapto and lower alkoxy radicals for any halogen atoms present in the pyridine nucleus of the isonicotinic acid amide obtained by treating the amide with a member of the group consisting of an alkali lower alkyl mercaptide and an alkali lower alkanolate in the presence of an aliphatic alcohol as solvent.

References Cited in the file of this patent

Billman et al.: Chem. Abst., vol. 38, col. 2651 (1944).
Supniewski et al.: Chem. Abst., vol. 45, col. 1593 (1951).